US009367950B1

(12) United States Patent
Scranton et al.

(10) Patent No.: US 9,367,950 B1
(45) Date of Patent: Jun. 14, 2016

(54) PROVIDING VIRTUAL REALITY EXPERIENCES BASED ON THREE-DIMENSIONAL DESIGNS PRODUCED USING THREE-DIMENSIONAL DESIGN SOFTWARE

(71) Applicant: IrisVR, Inc., Burlington, VT (US)

(72) Inventors: Shane S. Scranton, Burlington, VT (US); Thomas N. Beatty, Jr., Burlington, VT (US)

(73) Assignee: IrisVR, Inc., New York, NY (US)

( * ) Notice: Subject to any disclaimer, the term of this patent is extended or adjusted under 35 U.S.C. 154(b) by 0 days.

(21) Appl. No.: 14/316,774

(22) Filed: Jun. 26, 2014

(51) Int. Cl.
G06T 15/10 (2011.01)
(52) U.S. Cl.
CPC .................................... G06T 15/10 (2013.01)
(58) Field of Classification Search
None
See application file for complete search history.

(56) References Cited

U.S. PATENT DOCUMENTS

| 2002/0123812 | A1* | 9/2002 | Jayaram et al. | 700/98 |
| 2009/0209211 | A1* | 8/2009 | Kondo | 455/73 |
| 2012/0268463 | A1* | 10/2012 | Loberg | 345/420 |
| 2013/0262233 | A1* | 10/2013 | Bradley et al. | 705/14.64 |

OTHER PUBLICATIONS

Barequet et al, Repairing CAD Models, 1997, IEEE.*
Verlinden et al, Virtual Annotation: Verbal Communication in Virtual Reality, 1993, Georgia Institute of Technology.*
Broil, Populating the Internet: Supporting Multiple Users and Shared Applications with VRML, 1997, ACM.*
Bao et al., Immersive virtual product development, 2002, Elsevier.*
Rosenman et al., Designworld: A Multidisciplinary Collaborative Design Environment Using Agents in a Virtual World, 2006, Springer.*
Wu et al ("The incremental editing of faceted models in an integrated design environment." Computer-Aided Design 36.9 (2004): 821-833.).*
Arch Virtual URL: http://archvirtual.com/architectural-visualization/#.U6yNqbHn9RI [Retrieved on Jun. 23, 2014].
Our Technology 3D Reconstruction URL: http://floored.com/technology [Retrieved on Jun. 23, 2014].
WalkAbout3D URL: http://www.walkabout3d.com/index.php [Retrieved on Jun. 23, 2014].
WalkAbout3D URL: http://www.walkabout3d.com/index.php# Walkthrough SketchUp designs tab [Retrieved on Jun. 23, 2014].
WalkAbout3D http://www.walkabout3d.com/index.php# Record walkthroughs, and create videos tab [Retrieved on Jun. 23, 2014].

(Continued)

*Primary Examiner* — Kee M Tung
*Assistant Examiner* — Xin Sheng
(74) *Attorney, Agent, or Firm* — Pillsbury Winthrop Shaw Pittman LLP

(57) ABSTRACT

A system and method for providing a user virtual reality experience to visualize a three-dimensional design produced using three-dimensional design software are disclosed. The user may be enabled to visualize the three-dimensional design through a virtual reality application while the design is in progress. Changes to the three-dimensional design may be obtained dynamically and virtual reality information may be determined based on the dynamically obtained changes. The determined virtual reality information may be provided to the user for implementation of a virtual reality visualizing the three-dimensional design on a client device associated with the user.

18 Claims, 6 Drawing Sheets

(56) References Cited

OTHER PUBLICATIONS

WalkAbout3D URL: http://www.walkabout3d.com/index.php# Full screen, $1^{st}$ and $3^{rd}$ person views [Retrieved on Jun. 23, 2014].
WalkAbout3D Mobile URL: http://www.walkabout3d.com/Mobile/index.php [Retrieved on Jun. 23, 2014].
WalkAbout3D URL: http://www.walkabout3d.com/index.php# Joystick controller support tab [Retrieved on Jun. 23, 2014].
WalkAbout3D Viewer URL: http://www.walkabout3d.com/walkaboutViewer.php [Retrieved on Jun. 23, 2014].
Create Amazing Applications With Vizard VR Toolkit Core Features Rapid Development Tab URL: http://www.worldviz.com/products/vizard [Retrieved on Jun. 23, 2014].
Create Amazing Applications With Vizard VR Toolkit http://www.Worldviz.Com/Products/Vizard#Upcoming_Features [Retrieved on Jun. 23, 2014].
Create Amazing Applications With Vizard VR Toolkit http://www.worldviz.com/products/vizard#Supported_Hardware [Retrieved on Jun. 23, 2014].
Create Amazing Applications With Vizard VR Toolkit http://www.worldviz.com/products/vizard#Editions [Retrieved on Jun. 23, 2014].
Create Amazing Applications With Vizard VR Toolkit http://www.worldviz.com/products/vizard#Showcase [Retrieved on Jun. 23, 2014].
Architecture interactive Using my Model BMI in architecture http://architecture-interactive.com/using-my-model#Workflow [Retrieved on Jun. 23, 2014].
Architecture interactive Using my Model Optimization Requirements URL: http://architecture-interactive.com/using-my-model#Model_Requirements [Retrieved on Jun. 23, 2014].
Architecture interactive Using my Model Choose a rendering level that best suits your application URL: http://architecture-interactive.com/using-my-model#Rendering_level [Retrieved on Jun. 23, 2014].
Architecture interactive Using my Model Tutorials URL: http://architecture-interactive.com/using-my-model#Tutorials [Retrieved on Jun. 23, 2014].
Immersive Wide Area Walking System URL: http://www.worldviz.com/systems/walking-vr#Features [Retrieved on Jun. 23, 2014].
Immersive Wide Area Walking System Example Components URL http://www.worldviz.com/systems/walking-vr#Performance [Retrieved on Jun. 23, 2014].
Immersive Wide Area Walking System Tech Specs URL: http://www.worldviz.com/systems/walking-vr#Tech_Specs [Retrieved on Jun. 23, 2014].

\* cited by examiner

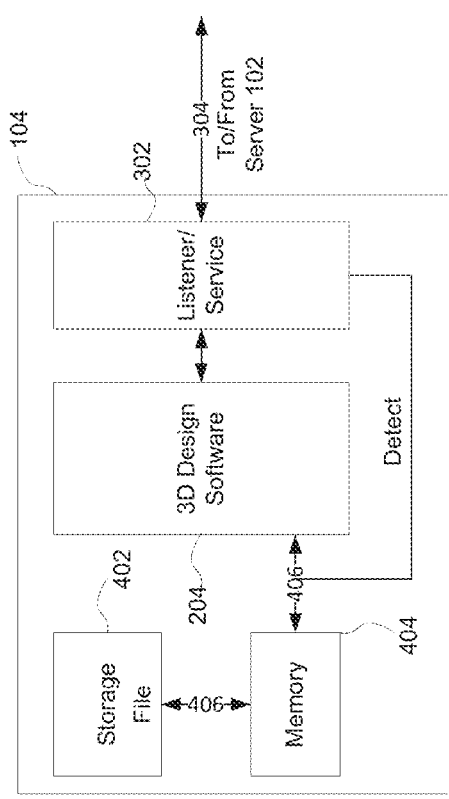
FIG. 4
FIG. 6
FIG. 5
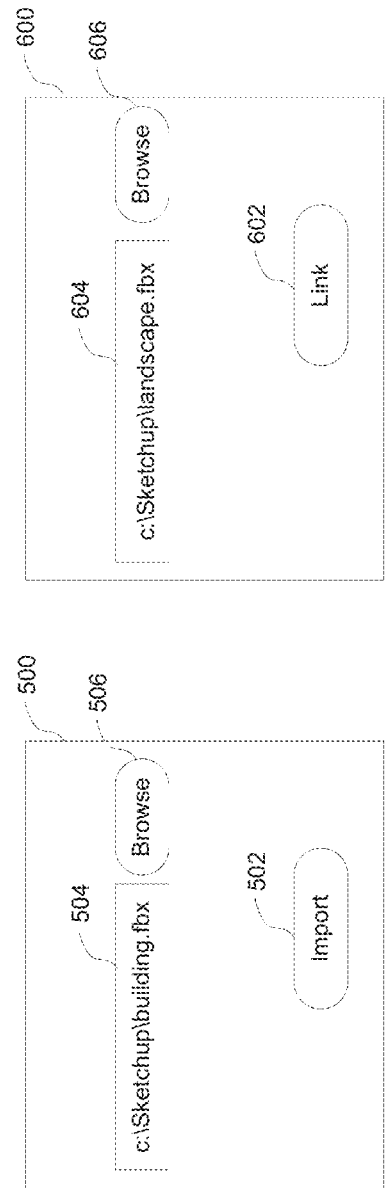

At time T1: File F1 is imported for the first time; Virtual Reality Information is generated for the first time based on F1

At time T2: A change C1 to F1 is detected and imported; Virtual Reality Information is re-generated based on C1

At time Tn: A change Cn to F1 is detected and imported; Virtual Reality Information is re-generated based on Cn

PROVIDING VIRTUAL REALITY EXPERIENCES BASED ON THREE-DIMENSIONAL DESIGNS PRODUCED USING THREE-DIMENSIONAL DESIGN SOFTWARE

FIELD OF THE DISCLOSURE

This disclosure relates to providing a user virtual reality experiences based on three-dimensional designs produced using three-dimensional (3D) design software.

BACKGROUND

Applications providing virtual reality (VR) experiences are generally known. Through the VR experiences provided by these applications, a user is typically enabled to interact with a virtual space such that the user may be immersed in the virtual space and interact with virtual objects therein. The VR experiences are typically provided by these applications to the user through a head mounted device (HMD), such as a helmet mounted display, a pair of wearable glasses, an Oculus device and/or any other types of HMD. Through the HMD, the user may traverse the virtual space (e.g., look-around, walk-around, fly-through), manipulate the virtual objects therein, perform an operation, exercise a control, and/or engage any other types of interactions with the virtual space. These applications typically execute the user interactions with the virtual space, and/or other related user tasks in real-time so that the user immersion in the virtual space is as convincing as possible. Sound, haptic devices, and other non-visual technologies may also be used to enhance the virtual experience significantly.

3D design software is known. Such software typically enables a user to compose two dimensional and/or three-dimensional models, specify layout of those models in a space, generate and manage digital representations of physical and functional characteristics of the space, and/to perform any other tasks for 3D designs. Common examples of 3D design software may include Autodesk AutoCAD®, Autodesk 3ds Max®, Trimble Sketchup®, Chief Architect®, Rhinoceros®, Dassault Systèmes Solidworks®, and any other 3D design software. However, such 3D design software does not enable a user to visualize his/her 3D design in a virtual reality.

Building Information Modeling or BIM is a methodology of organizing building design process by using digital building models that contain information about assets in the building. BIM software is a type of 3D design software and typically enables a designer to create a BIM model of a building by embedding information about objects, properties, relations and/or any other attributes of the building much like setting up a database for the building. Common examples of BIM software may include Autodesk Revit®, Autodesk Navisworks®, Nemetschek Vectorworks®, Graphisoft ArchiCAD, and any other 3D design software.

Visualization systems that generate architectural visualization based on files associated with 3D design software or BIM software is generally known. These systems typically import models from the files and convert them to a system specific internal model.

SUMMARY

One aspect of the disclosure relates to dynamically presenting visualization of three-dimensional (3D) designs produced by 3D design software. A user may be enabled to visualize of a 3D design through a virtual reality application while the design is in progress using 3D design software. To achieve this, changes to the 3D design may be obtained dynamically; and virtual reality information may be determined based on the dynamically obtained changes. The determined virtual reality information may be provided to the user for implementation on client device associated with the user. This may facilitate an iterative process in which the user is enabled to quickly immerse himself or herself in a virtual space that simulates the 3D design in progress, interact with the virtual space, modify the design through the 3D design software, and re-experience virtual reality based on the modified 3D design.

In some implementations, the dynamically determined virtual reality information may be provided to a group of users for presentation on their client devices simultaneously or near simultaneously. In some implementations, a user may be enabled to share the 3D design in virtual reality on social media-like website with another user. In some implementations, the user may be enabled to add sound information to create commentary for the virtual reality experience of the 3D design.

A system configured to provide virtual reality information may comprise a server. The server may operate in a client/server architecture with one or more client devices. The client devices may be associated with users. The server may be configured to execute one or more of the following: a user component, a file import component, a 3D information component, a virtual reality information determination component, a virtual reality information provision component, client device component, an interface component, and/or any other components.

The user component may be configured to access and/or manage one or more user profiles and/or user information associated with users of the system. The one or more user profiles and/or user information may include information stored by server, one or more of the client devices, and/or other storage locations.

The file import component may be configured to facilitate a user to import a file associated with 3D design software from the client device and/or any other storage location. The files associated with the 3D design software may include various formats and distinguished by corresponding file extensions. Some examples of such files may include, SKP, .blend, 3DM, DWG, DFX, FBX, DXF, C4D, DAE, OBJ, 3DS, OBJ, RVT, and/or any other file extensions. Such files may reside on the client device, the electronic storage, a network storage location, external resource, and any other storage location. The file importation facilitated by the file import component may be via a web interface implemented on a client device. In some implementations, the file import component may be configured to determine if the format of the file selected by the user is supported. In some implementations, the file import component may be configured to determine the size of the file selected by the user for determination whether the file exceeds a file size limitation on the server. In some implementations, the file importation facilitated by the file import component may be dynamic. In those implementations, the user may be enabled to specify one or more files such that responsive to changes made by the user to those files, the changes and/or the changed files are imported by the file import component.

The 3D information component may be configured to obtain 3D information from the files and/or changes to the files imported by the file import component. The 3D information obtained by the 3D information component may include position, size, texture, materiality, sound, shading, lighting, color, description, type, content, animation, scale, project, and/or any other information about one or more objects in the 3D design produced by the 3D design software. The 3D information component may obtain the 3D information by parsing the imported files, examining for predetermined field delimiters, extracting name-value pairs from the imported files, storing the name-value pairs in preset data structures, and/or perform any other operations.

The 3D information component may obtain the 3D information dynamically in a number of ways. In some implementations, the 3D information component may be configured to receive control information from another component in the server, for example the file import component, to obtain the 3D information from an imported file. In some implementations, the 3D information component may be configured to obtain 3D information on a predetermined or user selected cadence (e.g., once every minute) from the client device. In some implementations, a hybrid of the above-described push and pull methods may be used so that the 3D design in progress may be synchronized with the server in real-time or near real-time.

In some implementations, the 3D information component may be configured to determine if one or more geometry errors may exist in a file imported by the file import component. This may involve examining the content of the imported file, checking for geometry consistency between objects in the 3D design, consulting one or more preset geometry standards for the 3D design, calculating for potential geometry conflicts between the objects, and/or any other operations.

The virtual reality information component may be configured to determine virtual reality information based on the 3D information obtained by the 3D information component. The virtual reality information determined by the virtual reality information determination component may include definitions of one or more meshes, colliders, textures, materials, shaders, shadows, lightings, navigation configurations, cameras, proxies, scripts, and/or any other virtual reality information for implementation in virtual reality application, such as the virtual reality application. In implementations, the virtual reality information determination component 118 may be configured with three-dimensional graphics generation engine for determining the virtual reality information based on the 3D information.

The virtual reality information provision component may be configured to provide the virtual reality information determined by the virtual reality information determination component to the users. Providing virtual reality information by the virtual reality information provision component may involve obtaining user information regarding the user(s) to whom the determined virtual reality information may be provided. In some implementations, a user may be enabled to request a presentation of the determined virtual reality information, and upon receiving such a request, the virtual reality information provision component may provide the determined virtual reality information to the user. For example, an interface may be presented via a web page so that the user may request the visualization of the 3D design in progress in virtual reality via a browser. In some implementations, more than one user may be provided the virtual reality information to facilitate a group preview. In those implementations, a list of users may be specified via an interface so that the users on the list will receive the virtual reality information when a presentation request is received.

The client device component may be configured to effectuate transmission of virtual reality information to the individual client devices. In implementations, the client device component may be configured to communicate with the individual client devices, adapt the virtual reality information based on the virtual reality presentation capabilities of the client devices, and/or provide any other functionality. For example, in some implementations, the client device component may be configured to adapt the virtual reality information based on the presentation capability of the individual client devices. For example, the client device component may be configured to adapt the virtual reality information for client devices that lack 3D graphics support such that only 2D graphics will be presented when the adapted virtual reality information is implemented on those client devices.

The interface component may be configured to generate graphical user interface information for implementation on the client devices. Various interfaces may be facilitated by the interface component to enable a user to share a 3D design in virtual reality on a social media-like website, add lighting to the visualization of the 3D design in virtual space, specify toggle points in the virtual space, add commentary to the virtual space, and/or perform any other user operations.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4 illustrates one example of facilitating the communication shown in FIG. 3 by the client device.

FIG. 5 illustrated one example of a web interface that enables a user to import a file associated with 3D design software.

FIG. 6 illustrates an interface that facilitates a user to dynamically link a file associated with the 3D design software with the server illustrated in FIG. 1.

DETAILED DESCRIPTION

Figure 1:
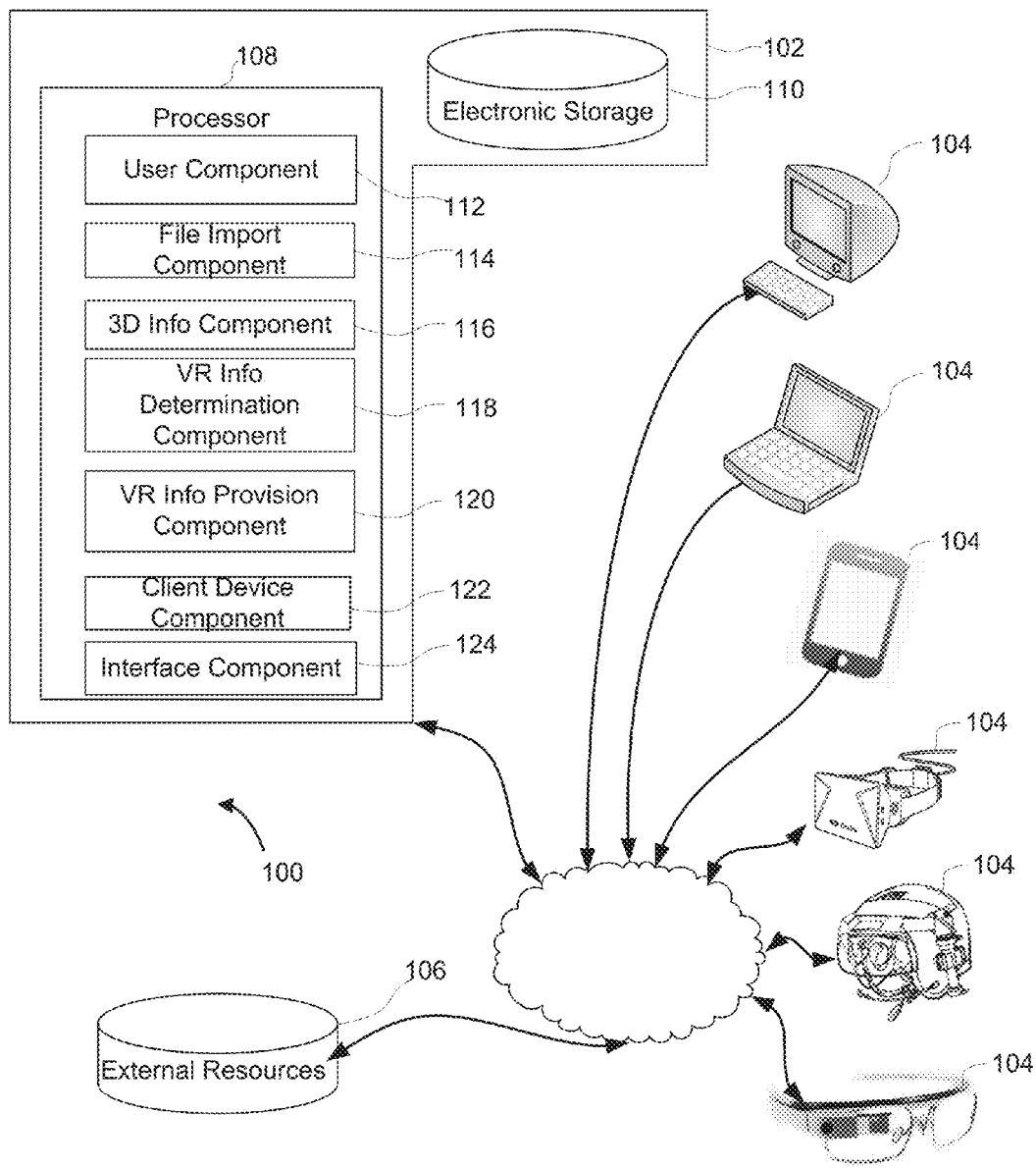
FIG. 1 illustrates one example of a system configured for providing a user a virtual reality experience based on a 3D design produced by 3D design software in accordance with the disclosure.

FIG. 1 illustrates a system 100 for providing a user a virtual reality experience based on a 3D design produced by 3D design software in accordance with the disclosure. In some implementations, as shown in this example, system 100 may include a server 102. As shown, the server 102 may be configured to communicate with a client device 104 via a network. The client devices 104 may be associated with users and may implemented a virtual space visualizing a 3D design in virtual reality based on virtual reality information provided by the server 102. The client devices 104 may include or be coupled to displays for presenting the virtual space to the user.

A client device 104 may include one or more processors configured to execute computer program components. The computer program components may be configured to facilitate a user to produce a 3D design using 3D design software, present the user visualization of the 3D design in virtual reality, enable the user to interact with the virtual space, and/or provide any other functionality. FIG. 1 illustrates some examples of the client device 104, which, as shown, may include one or more of a mobile phone, a tablet, a netbook, a laptop, a desktop, a HMD device and/or any other types of client devices 104.

Figure 2:
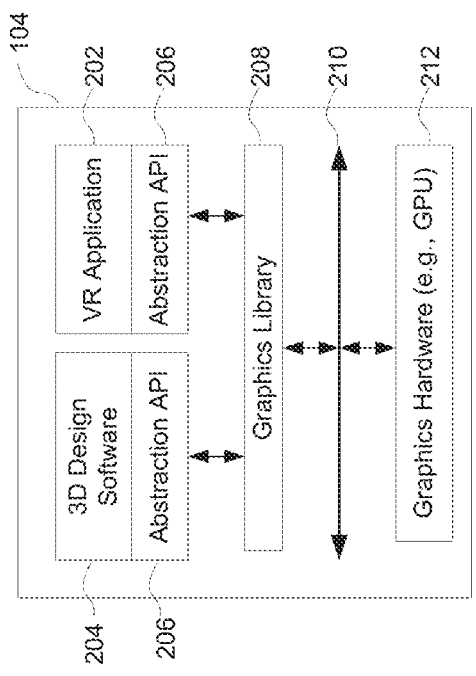
FIG. 2 illustrates one example of a client device illustrated in FIG. 1.

FIG. 2 illustrates one example of a client device 104 illustrated in FIG. 1. As shown, the client device 102 may include 3D design software 204, virtual reality application 202, abstraction APIs 206, graphics library 208, a system bus 210, graphics hardware 212, and/or any other components. It should be understood the components shown in FIG. 2 as included in the client device 104 is merely illustrative and are not intended to be limiting. In various implementations, a client device 104 may include more or less components than those shown in FIG. 2. For example, in some implementations where the client device 104 is used primarily as a display device for presenting the visualization of the 3D design in virtual reality (e.g., a HMD), the client device 104 may not include the 3D design software 204, and/or the associated abstraction API 206. In some implementations, a display device (e.g., a HMD) may be coupled with external processing hardware (e.g., a PC, smartphone, or other graphics hardware) such that the client device actually consists of multiple discrete, but connected hardware components.

The 3D design software may enable a user to create models (two dimensional and/or three-dimensional), building specifications, design blueprints, drawings, photographic illustrations, and/or any other artifacts for a 3D design. As used herein, a 3D design may be referred to as a design of buildings, landscape, interiors, objects, civil engineering, mechanic engineering, and/or any other types of designs that organizes, arranges and/or creates shapes, objects, parts, components in a space. The 3D design software 204 may include industrial standard software for providing architectural models and/or drawings, mechanical designs, system designs, component designs, building information, illustration and/or any other types of designs. As such, the 3D design software 204 may include CAD or modeling software, such as Autodesk AutoCAD®, Autodesk 3ds Max®, Trimble Sketchup®, Chief Architect®, Rhinoceros®, Dassault Systèmes Solidworks®. The 3D design software 204 may include BIM software, such as Autodesk Revit®, Autodesk Navisworks®, Nemetschek Vectorworks®, Graphisoft ArchiCAD, and/or any other BIM software.

The virtual reality application 202 may be configured to implement an instance of a virtual space based on the virtual reality information provided by the server 102. The instance of the virtual space may represent a three-dimensional visualization of the 3D design produced by the 3D design software 204. The instance of the virtual space may reflect a state of the 3D design as it is being completed towards finalization. Implementation of the instance of the virtual space by the virtual reality application 202 may involve determining a view of the virtual space, and/or other information that describes the virtual space. Expressions of the instance of virtual space on the client device 104 may facilitate presentation of views of the virtual space to the user associated with the client device 104. In some implementations, expressions of the instance executed on the client device 104 may be configured to simply present views of the virtual space based on the virtual reality information (e.g., via streaming information, object/position information, and/or other virtual reality information) received from server 102. The view presented on the client device 104 may correspond to a location in the virtual space (e.g., the location from which the view is taken, the location the view depicts, and/or other locations), a zoom ratio, a dimensionality of objects, a point-of-view, and/ or view parameters. One or more of the view parameters may be selectable by the user.

The instance of the virtual space may comprise a simulated space that is accessible by users via clients that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein).

The above description of the views of the virtual space determined from the virtual reality information is not intended to be limiting. The virtual space may be presented in a more limited, or richer, manner. The views may include additional content (e.g., text, audio, pre-stored video content, and/or other content) that describes particulars of the current state of a place in the virtual space, beyond the relatively generic graphics. For example, a view may include a generic graphic with a textual description of the objects positioned in the virtual space. Other representations of individual places within the virtual space are contemplated.

Within the instance of the virtual space implemented by virtual reality application 202, users may traverse the virtual space, manipulate the virtual objects in the virtual space, perform operation, exercise control, and/or engage any other types of interactions with the virtual space. The users may participate in the instance of the virtual space by controlling one or more of the available user controlled elements in the virtual space. Control may be exercised through control inputs and/or commands input by the users through client device 104. The user may interact with each other through communications exchanged within the virtual space. Such communications may include one or more of textual chat, instant messages, private messages, voice communications, and/or other communications. Communications may be received and entered by the users via their respective client device 104. Communications may be routed to and from the appropriate users through server 102 (e.g., through a user communication component).

Examples of a virtual reality application for implementing the instance of the virtual space may include a browser, a dedicated virtual reality rendering application, a mobile application such as iOS or Android, a native virtual reality engine embedded in a HMD device, and/or any other types of virtual reality applications.

The abstraction API 206 may be associated with the virtual reality application 202 and/or the 3D design software 204 for communicating with the graphics library 208. The graphics library 208 may provide the virtual reality 202 and the 3D design software 204 a set of graphics functionality by employing the graphics hardware 212 via a system bus 210. Common examples of the abstraction API 206 may include Java 3D, WebGL, Three.js, node.js, and/or any other abstraction API. Common examples of the graphics library 208 may include DirectX, open GL, 3Ds Max, Max Cinema 4D and any other graphics library 208.

Returning to FIG. 1, the server 102, client devices 104, and/or external resources 106 may be operatively linked via one or more electronic communication links. For example, such electronic communication links may be established, at least in part, via a wireless link. It will be appreciated that this is not intended to be limiting, and that the scope of this disclosure includes implementations in which server 102, client devices 104, and/or external resources 106 may be operatively linked via some other communication media. The communications between the client device 104 and server 102 may be implemented in any suitable communications protocols as however desired. Examples of the communications protocols may include HTTP (including any variation of the HTTP), P2P, WebSocket, FTP, RPC, and/or any other communications protocols, including those which may or may not fall under the TCP/IP suite of protocols.

Figure 3:
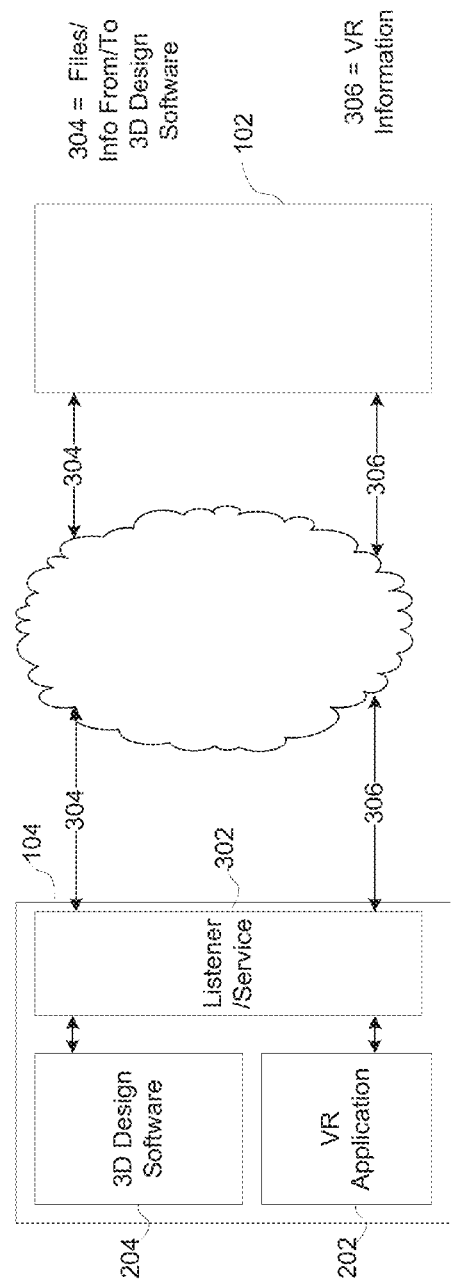
FIG. 3 illustrates one example of information communicated between the client device and the server illustrated in FIG. 1.

FIG. 3 illustrates one example of information communicated between the client device 104 and the server 102. It will be described with reference to FIGS. 1-2. As shown in this example, the client device 104 may include a listener/service component 302 configured to monitor and/or service the 3D design software 206, the virtual reality application 202, and/or any other components in the client device 104. As shown, the listener/service component 302 may be configured to transmit and/or receive information 304 representing a 3D design produced by the 3D design software. In some implementations, the information 304 may simply include files associated with the 3D design software 304 that describe the two dimensional and/or three-dimensional modeling of the 3D design. In some implementations, the information 304 may include changes made to the two dimensional and/or three-dimensional modeling of the 3D design. In some implementations, the information 304 may include control information, such as user commands, server instructions and/or any other type of control information, to facilitate transmission of the information 304. By way of non-limiting example, the server 102 may transmit instructions periodically to obtain the information 304 from the client device 104.

As also shown in FIG. 3, the listener/service component 302 may be configured to transmit and/or receive virtual reality information 306 to/from the server 102. As described above, the virtual reality information 306 may be used by the virtual reality application 202 to implement a virtual space for presenting the user visualization of the 3D design in virtual reality.

FIG. 4 illustrates one example of facilitating the communication shown in FIG. 3 by the client device 104. It will be described with reference to FIG. 3. As shown in this example, the client device 104 shown in FIG. 3 may include a file storage unit 402 and a memory unit 404. In this example, the 3D design software 204 is configured to retrieve and save changes 406 of the 3D design made by the user to the file storage unit 402 via the memory unit 404. The changes 406 may include changes (including addition and deletion) made to the two dimensional and/or three-dimensional models of the 3D design, attribute changes in BIM specification, changes in drawings, and/or any other types of changes. In this example, as illustrated, the listener/service component 302 may be configured to detect the changes 406 as they are saved to the file storage unit 402 by the 3D design software 204. This may involve tracking the state change of the files associated with the 3D design software 204 storing in the file storage unit 402, such as changes in date and time of modification, file size, content of the file, and/or any other state changes of those files.

Responsive to a detection that changes 406 have been saved to the files associated with the 3D design software 204, the listener/service component 304 may be configured to transmit the changes 406 to the server 102. In implementations, the changes 406 may be embedded in the information 304 as payload. Information identifying the changes 406 and/or control information (e.g., time stamp) may be additionally included in the information 304 for transmitting the changes 406 to the server 102. In some implementations, the information 304 may simply include the latest version of the changed file. In those implementations, the server 102 may analyze the changed files and obtain the changes 406, e.g., via the 3D information component 116.

Returning to FIG. 1, the server 102 may include one or more processors 108 configured to execute computer-readable instructions to implement computer program components. The computer program components may include one or more of user component 112, file import component 114, 3D information component 116, virtual reality information determination component 118, virtual reality information provision component 120, client device component 122, interface component 124 and/or any other components.

The user component 112 may be configured to access and/or manage one or more user profiles and/or user information associated with users of the system 100. The one or more user profiles and/or user information may include information stored by server 102, one or more of the client devices 104, and/or other storage locations. The user profiles may include, for example, information identifying users (e.g., a username or handle, a number, an identifier, and/or other identifying information), security login information (e.g., a login code or password), account information, subscription information, virtual currency account information (e.g., related to currency held in credit for a user), relationship information (e.g., information related to relationships between users of system 100), demographic information associated with users, information stated by users, purchase information of users, browsing history of users, a client device identification associated with a user, a phone number associated with a user, and/or other information related to users.

The file import component 114 may be configured to facilitate a user to import a file associated with 3D design software from the client device 104 and/or any other storage location. As described above, the user may employ the 3D design software to create models (two dimensional and/or three-dimensional), building specifications, design blueprints, drawings, and/or any other artifacts for a 3D design. The files associated with the 3D design software may include various formats and distinguished by corresponding file extensions. Some examples of the files that may be imported by the file import component 114 may include, SKP, .blend, 3DM, DWG, DFX, FBX, DXF, C4D, DAE, OBJ, 3DS, OBJ, RVT, and/or any other file extensions. The files that may be imported by the file import component 114 may reside on the client device 104, the electronic storage 110, a network storage location, external resource 106, and any other storage location.

The file importation facilitated by the file import component 114 may be via a web interface implemented on a client device 104. FIG. 5 illustrated one example of a web interface that enables a user to import a file associated with 3D design software. As illustrated in FIG. 5, a web interface 500 may be implemented on a client device 104. Graphical user interface Information for implementing the interface 500 may be generated by the system 100, for example, via an interface component the similar to or the same as the interface component 124 described herein. As shown, the web interface 500 may comprise field controls 502, 504, 506, and other field controls (if any). The filed control 506 (e.g., a button in this example) may be provided in the interface 500 to enable the user to select a file having a file extension as described above. The field control 504 (e.g., an input box) may be provided in interface 500 to reflect the file selected by the user via the button 506. Through the filed control 504, the user may modify the file path and/or file name. The field control 502 may be provided in interface 500 to enable the user to generate an "import" command instructing the server 102 to import the file selected by user. In some implementations, interface 500 may enable the user to drag and drop a file into the field control 504.

Returning to FIG. 1, in implementations, responsive to receiving the "import" instruction from the user, the file import component 114 may parse the instruction. In some implementations, the "import" instruction may include the actual file selected by the user (e.g., the user uploads the file) and the file import component 114 in those implementation may simply import the file by saving the received file to a storage location (e.g., memory or hard drive). In some implementations, the user "import" instruction may include a file path and name, and the file import component 114, in those implementations, may retrieve the file using such file information. The file path in those examples may point to a file or segments in the client device 104, in the electronic storage 110, in a network location, in a location in the GPU of the client device, in a server provided by a third party partner, and/or any other locations where the file associated with the 3D design software may be stored.

In some implementations, the file import component 114 may be configured to determine if the format of the file selected by the user is supported by the server 102. This may involve examining the content of the file from the user, determining whether the file has a supported format, and/or any other operations. In the case where the file import component 114 determines that the file format is not supported, the file import component 114 may be configured to generate a message to the client device 104 to inform the user that the file selected by the user is not supported by server 102. In some implementations, the file import component 114 may be configured to determine the size of the file selected by the user for determination whether the file exceeds a file size limitation on the server 102. In those implementations, when it is determined that the file has exceeded the size, the file import component 114 may be configured to generate an error message and effectuate a transmission of the error message to the client device 104 by which the user has previously selected the file.

In some implementations, the file importation facilitated by the file import component 114 may be dynamic. In those implementations, the user may be enabled to specify one or more files such that responsive to changes made by the user to those files, the changes and/or the changed files are imported to the sever 102 by the file import component 114. FIG. 6 illustrates an interface that facilitates a user to dynamically link a file associated with the 3D design software 204 with the server 102. It will be described with reference to FIG. 3. Graphical user interface Information for implementing the interface 600 may be generated by the system 100, for example, via an interface component the similar to or the same as the interface component 124 described herein. As shown, an interface 600 may be presented on a client device 104 to enable a user to dynamically link a file associated with the 3D design software 204 with the server 102 (e.g., by drag & drop the file into filed control 604). This allows the server 102 to configure the listener/service component 304 to monitor the file as illustrated and described in FIG. 4. Responsive to a change to the file as detected by the listener/service component 304, the file import component 114 may import the changes and/or the changed files automatically, without user intervention.

Returning to FIG. 1, the 3D information component 116 may be configured to obtain 3D information from the files and/or changes to the files imported by the file import component 114. The 3D information obtained by the 3D information component 116 may include position, size, texture, materiality, sound, shading, lighting, color, description, type, content, animation, scale, project, and/or any other information about one or more objects in the 3D design produced by the 3D design software. In some implementations, such 3D information may be readily available in the files imported by the file import component 114 in ASCII format. In those implementations, the 3D information component 116 may obtain the 3D information by parsing the imported files, examining for predetermined field delimiters, extracting name-value pairs from the imported files, storing the name-value pairs in preset data structures, and/or perform any other operations. In some implementations, the files imported by the file import component 114 may include information (e.g., such as binary information or drawing information) that may not readily indicate the 3D information. In those implementations, the 3D information component 116 may be configured to convert the imported files into a format from which the 3D information may be obtained; read and parse the binary data according to the specifications of the file format and sent directly to the processor without intermediary conversion; and/or perform any other operations for obtaining 3D design information.

The 3D information component 116 may obtain the 3D information dynamically in a number of ways. In some implementations, the 3D information component 116 may be configured to receive control information from another component in the server 102, for example the file import component 114, to obtain the 3D information from an imported file. In those implementations, the obtaining of the 3D information by the 3D information component 116 may be dynamic by virtue of the listener/service mechanism illustrated and described in FIG. 4 and FIG. 6. In some implementations, the 3D information component 116 may be configured to obtain 3D information on a predetermined or user selected cadence (e.g., once every minute) from the client device 104 via the file import component 114. In those implementations, the 3D information component 116 may generate control command to instruct the file import component 114 to import files on such a cadence. In some implementations, a hybrid of the above-described push and pull methods may be used so that the 3D design in progress in the 3D design software 204 may be synchronized with the server 102 in real-time or near real-time.

In some implementations, the 3D information component 116 may be configured to determine if one or more geometry errors may exist in a file imported by the file import component 114. This may involve examining the content of the imported file, checking for geometry consistency between objects in the 3D design, consulting one or more preset geometry standards for the 3D design, calculating for potential geometry conflicts between the objects, and/or any other operations. The 3D information component 116, in those implementations, may be configured to generate a report of the geometry errors detected and effectuate transmission of the report to the client device 104 for notification to the user.

Figure 7:
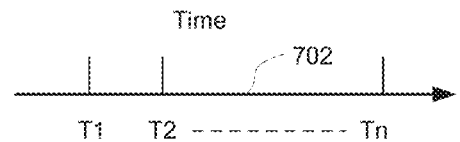
FIG. 7 illustrates one example of dynamically determining virtual reality information in accordance with the disclosure.

The virtual reality information component 118 may be configured to determine virtual reality information based on the 3D information obtained by the 3D information component 116. The virtual reality information determined by the virtual reality information determination component 118 may include definitions of one or more meshes, colliders, textures, materials, shaders, shadows, lightings, navigation configurations, cameras, proxies, scripts, and/or any other virtual reality information for implementation in a virtual reality application, such as the virtual reality application 202. In implementations, the virtual reality information determination component 118 may be configured with three-dimensional graphics generation engine for determining the virtual reality information based on the 3D information. In one implementation, without limitation, the virtual reality information determination component 118 is configured with a Unity3D® game engine, Cryengine game engine, or the Unreal Engine to generate the virtual reality information. As such, unlike the conventional virtual reality information determination systems, the virtual reality information determination component 118 may determine the virtual reality information in a dynamic and incremental fashion. This is illustrated in FIG. 7.

Figure 8:
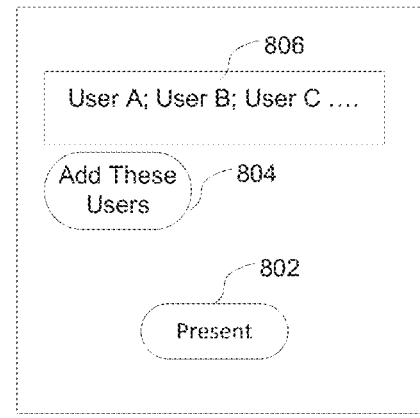
FIG. 8 illustrates one example of an interface to enable the user to request presentation of the virtual reality information determined by the server illustrated in FIG. 1.

The virtual reality information provision component 120 may be configured to provide the virtual reality information determined by the virtual reality information determination component 118 to the users. Providing virtual reality information by the virtual reality information provision component 120 may involve obtaining user information regarding the user(s) to whom the determined virtual reality information may be provided. This may involve querying for such user information from the user component 112. In some implementations, a user may be enabled to request a presentation of the virtual reality information determined by the server 102, and upon receiving such a request, the virtual reality information provision component 120 may provide the user virtual reality information. FIG. 8 illustrates one example of an interface 800 to enable the user to request presentation of the virtual reality information determined by the server 102. Graphical user interface information for implementing the interface 800 may be generated by the system 100, for example, via an interface component the similar to or the same as the interface component 124 described herein. As shown, the interface 800 may be implemented on a client device 104 to enable the user to request presentation of the virtual reality information through a control button 802. For example, the interface 800 may be presented via a web page so that the user may request the visualization of the 3D design in progress in virtual reality via a browser.

Figure 9:
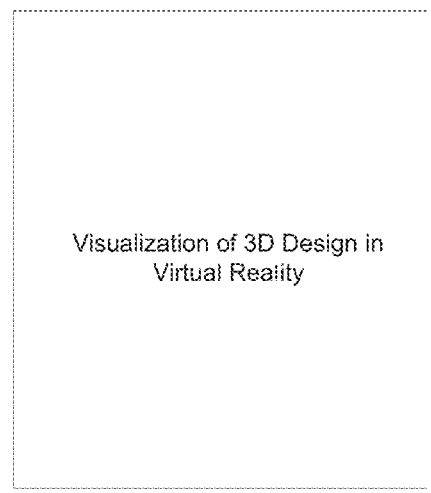
FIG. 9 illustrates the client device may implement the visualization of the virtual reality information provided by the server illustrated in FIG. 1.
Figure 10:
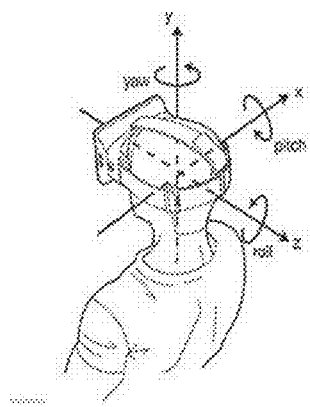
FIG. 10 illustrates presenting the virtual reality information using a client device that includes a HMD.

Returning to FIG. 1, responsive to receiving the presentation request from the user, the virtual reality information provision component 120 may provide the virtual reality information determined by the virtual reality information determination component 118 to the client device 104. As shown in FIG. 3, the virtual reality information may be provided to the client device 104 via a network. FIG. 9 illustrates the client device 104 may implement the visualization of the virtual reality information provided by the server 102. As described above, a dedicated virtual reality rendering application, a browser, and/or any other virtual reality application 202 may be employed to present the visualization of the 3D design. FIG. 10 illustrates presenting the virtual reality information using a client device 104 that includes a HMD. In any case, as illustrated by FIG. 9 and FIG. 10, the user may be enabled to visualize his/her 3D design in progress through the virtual reality application 202.

Figure 11:
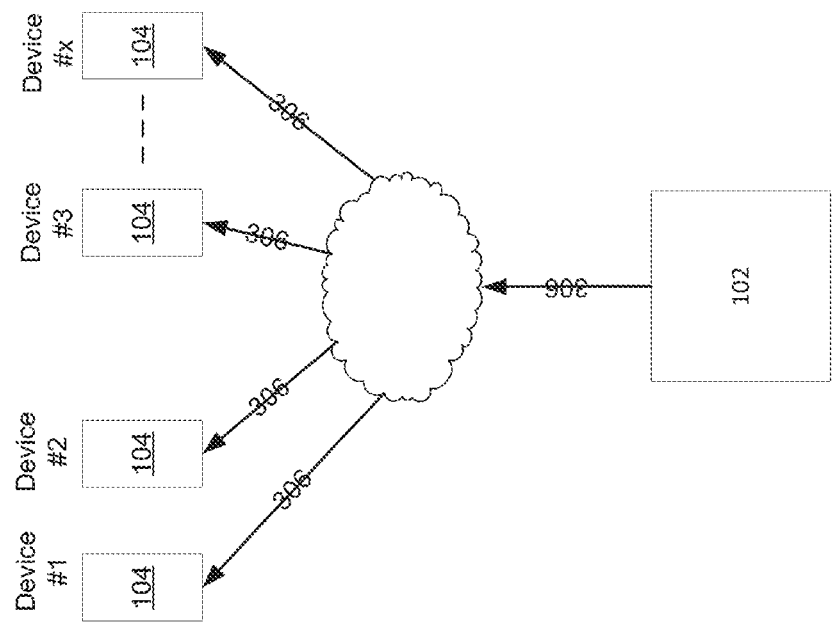
FIG. 11 illustrates providing the virtual reality information to a group of users.

In some implementations, more than one user may be provided the virtual reality information to facilitate a group preview so that those users may experience the visualization of the 3D design simultaneously or near-simultaneously. This is illustrated in FIG. 11. In those implementations, a list of users may be specified via an interface, such as the interface 800, so that the users on the list will receive the virtual reality information for presentation when a presentation request is received. As shown in FIG. 8, through the interface 800, the list of users may be added via controls 804 and 806 for presenting the virtual reality information determined by the server 102. Such a list of users may be specified by the user that controls (e.g., the user that imports or links) the file associated with the 3D design software, by an administrator of the system 100, the provider of the system 100 and/or any other entities. User information such as the client devices 104 associated with the users on the list may be obtained for transmission of the virtual reality information to those users.

The client device component 122 may be configured to effectuate transmission of virtual reality information to the individual client devices 104. In implementations, the client device component 122 may be configured to communicate with the individual client devices 104 (e.g., via the listener/service component 302 on the client devices 104), adapt the virtual reality information based on the virtual reality presentation capabilities of the client devices 104, and/or provide any other functionality. For example, in some implementations, the client device component 122 may be configured to adapt the virtual reality information based on the presentation capability of the individual client devices 104. For instance, some client device 104 may not be capable of presenting 3D graphics due to the limitation of their graphics library/hardware, while some other client devices may be capable of presenting superior 3D graphics. For example, the client device component 122 may be configured to adapt the virtual reality information for client devices 104 that lack 3D graphics support such that only 2D graphics will be presented when the adapted virtual reality information is implemented on those client devices.

The interface component 124 may be configured to generate graphical user interface information for implementation on the client devices 104. The graphical user interface information generated by the interface component 124 may include interfaces 500, 600, 800, 900 and any other interfaces described herein.

Some other functionality provided by server 102 will be described below in connection with corresponding interfaces facilitating the functionality. These interfaces may be facilitated by the interface component 124 and may be implemented on the client device 104.

Social media sharing: the server 102 may enable a user to share a 3D design through virtual reality information on social media-like website provided by system 100 and/or provided a third party associated with the provider(s) of system 100. An interface may be provided to the user such that the user may share the 3D design on the social media. For example, the user may be enabled to post a link to the virtual reality information (e.g., prepared by the virtual reality information provision component 120), to a user wall, a user group chat interface, a circle, and/or any other medium provided by the social media. Through the shared link, a recipient may obtain the virtual reality information and visualize the 3D design on a client device associated with the recipient.

Lighting: the server 102 may enable a user to add various lighting to the visualization of the 3D design when implemented on the client device 104. For example, an interface may be provided to enable the user to specify the position, angle, source, intensity, shadow, and/or any other attributes of the lighting.

Virtual space toggling: the server 102 may enable a user specify one or more points/locations in the virtual space such that the user may toggle between those locations in a quick traverse mode. For example, an interface may be provided to enable the user to specify points corresponding to "main entrance", "window", "wall" and/or any other components in the virtual space. Through these points, the user may be enabled (e.g., by "clicking" on those points via a data glove) to quickly traverse from one point to another point without having to traverse the path between the points.

Commentary creation: the server 102 may enable a user specify one or more objects/points/locations in the virtual space such that commentary may be presented when those objects/points/locations are engaged in the virtual space. For example, an interface may be provided to enable the user associated sounds/commentary with points such as "main entrance", "window", "wall" and/or any other components in the virtual space. Through these points, commentary may be presented to the user in the virtual space.

The external resources 106 may include sources of information, hosts and/or providers of Internet services outside of system 100, external entities participating with system 100, and/or other resources. In some implementations, some or all of the functionality attributed herein to external resources 106 may be provided by resources included in system 100. Examples of external resources 106 may include social media sites (e.g., Facebook™, Twitter™, Weibo™ and any other social media sites), network storage (e.g., Dropbox™, Google Drive™ and any other network storage), an Internet service account (e.g., account provided by an ISP), an online game account (e.g., account provided by a game provider), and/or any other type(s) of external resources.

The server 102 may include electronic storage 110, one or more processors 108, and/or other components. The server 102 may include hardware to enable the exchange of information via a wireless link. Illustration of server 102 in FIG. 1 is not intended to be limiting. The server 102 may include a plurality of hardware, software, and/or firmware components operating together to provide the functionality attributed herein to server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a FireWire port, etc.) a memory card (e.g., microSD™), or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in control unit 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute components 112, 114, 116, 118, 120, 122, 124. Processor 108 may be configured to execute components 112, 114, 116, 118, 120, 122, 124 by software, hardware, firmware, some combination of software, hardware, and/or firmware, and/or other mechanisms for configuring processing capabilities on processor 108.

It should be appreciated that, although components 112, 114, 116, 118, 120, 122, 124 are illustrated in FIG. 1 as being co-located within a single processing unit, in implementations in which processor 108 includes multiple processing units, one or more of components 112, 114, 116, 118, 120, 122, 124 may be located remotely from the other components. The description of the functionality provided by the different components 112, 114, 116, 118, 120, 122, 124 described below is for illustrative purposes, and is not intended to be limiting, as any of components 112, 114, 116, 118, 120, 122, 124 may provide more or less functionality than is described. For example, one or more of components 112, 114, 116, 118, 120, 122, 124 may be eliminated and some or all of its functionality may be provided by other ones of components 112, 114, 116, 118, 120, 122, 124. As another example, processor 108 may be configured to execute one or more additional components that may perform some or all of the functionality attributed below to one of components 112, 114, 116, 118, 120, 122, 124.

Figure 12:
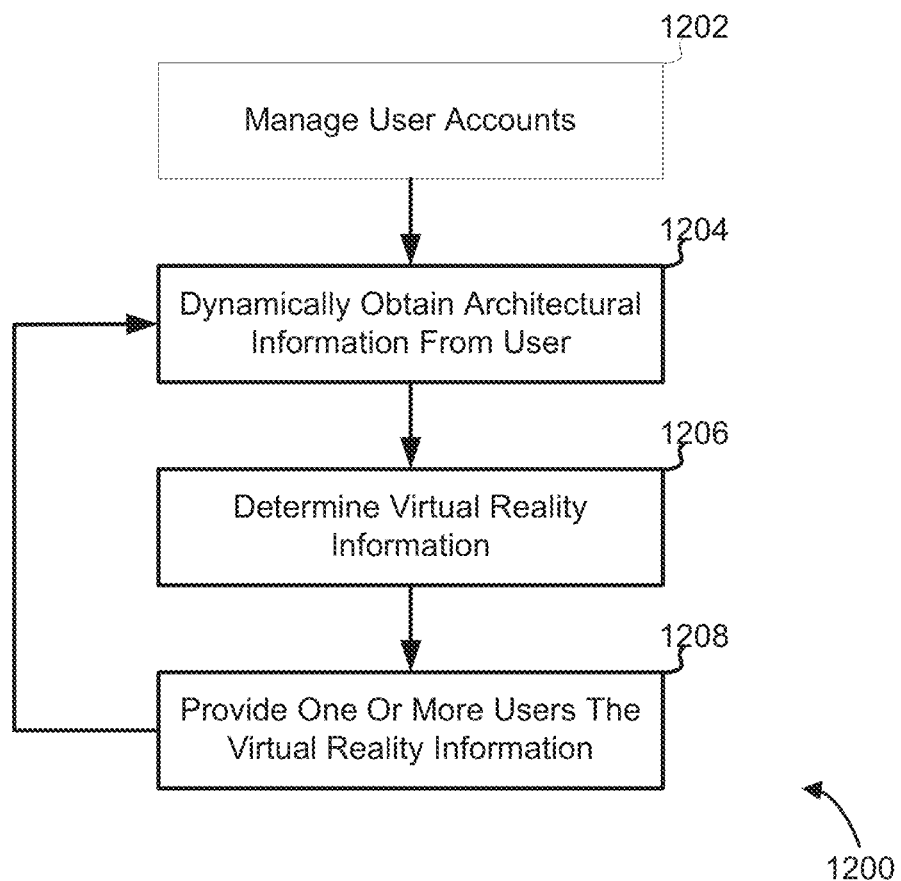
FIG. 12 illustrates one example of a method for providing the virtual reality experiences based on 3D designs produced by 3D design software in accordance with the disclosure.

FIG. 12 illustrates one example of a method for providing the virtual reality experiences based on 3D designs produced by 3D design software in accordance with the disclosure. The operations of method 1200 presented below are intended to be illustrative. In some embodiments, method 1200 may be accomplished with one or more additional operations not described, and/or without one or more of the operations discussed. Additionally, the order in which the operations of method 1200 illustrated in FIG. 12 and described below is not intended to be limiting.

In some embodiments, method 1200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1200 in response to instructions stored electronically on an electronic storage medium. The one or more processing devices may include one or more devices configured through hardware, firmware, and/or software to be specifically designed for execution of one or more of the operations of method 1200.

At an operation 1202, user accounts may be managed. In some implementations, operation 1202 may be performed by a user component the same as or similar to user component 112 (shown in FIG. 1 and described herein).

At an operation 1204, 3D information may be dynamically obtained from a user. The 3D information obtained in operation 1204 may include position, size, texture, materiality, sound, shading, lighting, color, description, type, content, animation, scale, project, and/or any other information about one or more objects in the 3D design produced by 3D design software. The 3D information may be obtained in operation 1204 dynamically in a number of ways. In some implementations, the operation 1204 may involve receiving control information to obtain the 3D information from an imported file. The imported file may be associated with the 3D design software and may include various formats with corresponding file extensions. Some examples of the imported file may include SKP, .blend, 3DM, DWG, DFX, FBX, DXF, C4D, DAE, OBJ, 3DS, OBJ, RVT, and/or any other file extensions. In some implementations, the 3D information component may be obtained in operation 1204 on a predetermined or user selected cadence (e.g., once every minute) from a client device. In some implementations, a hybrid of the above-described push and pull methods may be used so that the 3D design in progress in the 3D design software may be synchronized in real-time or near real-time. In some implementations, operation 1204 may be performed by a 3D information component the same as or similar to 3D information component 116 (shown in FIG. 1 and described herein).

At operation 1206, virtual reality information may be determined based on the 3D information obtained in operation 1204. The virtual reality information determined in operation 1206 may include definitions of one or more meshes, colliders, textures, materials, shaders, shadows, lightings, navigation configurations, cameras, proxies, scripts, and/or any other virtual reality information for implementation in virtual reality application, such as the virtual reality application. In some implementations, operation 1206 may be performed by a virtual reality information determination component the same as or similar to virtual reality information determination component 118 (shown in FIG. 1 and described herein).

At operation 1208, the virtual reality information determined in operation 1206 may be provided to one or more users. In some implementations, operation 1208 may be performed by a virtual reality information provision component the same as or similar to virtual reality information provision component 120 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for providing an immersive virtual reality environment to a user, the immersive virtual reality environment being provided based on a three-dimensional design produced using three-dimensional design software, the system comprising:

one or more physical processors configured by machine-readable instructions to:

automatically obtain three-dimensional information representing the three-dimensional design, wherein the three-dimensional information representing the three-dimensional design is automatically obtained responsive to a file import of a file associated with the three-dimensional design software;

determine virtual reality information using a virtual reality provision component for providing the immersive virtual reality environment through a head mounted display device based on the three-dimensional information, the immersive virtual reality environment comprising one or more three-dimensional virtual objects simulating the three-dimensional design such that the user is immersed in the virtual reality environment to interact with the three-dimensional virtual objects in the virtual reality environment via the head mounted display device associated with the user, wherein the determination of the virtual reality information includes:

obtaining a first three-dimensional information automatically at a first time point;

generating the virtual reality information using the virtual reality provision component at the first time point based on the first three-dimensional information automatically obtained at the first time point;

displaying the virtual reality information generated using the virtual reality provision component at the first time point on the head mounted display device associated with the user;

obtaining a second three-dimensional information automatically at a second time point;

determining whether the second three-dimensional information automatically obtained at the second time point is different from the first three-dimensional information obtained at the first time point; and responsive to a determination that the second three-dimensional information obtained at the second time point is different from the first three-dimensional information obtained at the first time point, re-generating the virtual reality information by modifying the virtual reality information generated at the first time point by inputting a difference between the first three-dimensional information and the second three-dimensional information into the virtual reality information generated at the first time point using the virtual reality provision component without re-generating by the virtual reality provision component, the virtual reality information generated at the first time point; and output the re-generated virtual reality information on the head mounted display device associated with the user to enable the head mounted display device to display the re-generated virtual reality information including the difference between the first three-dimensional information and the second three-dimensional information in the immersive virtual reality environment to the user.

2. The system of claim 1, wherein the three-dimensional design software is industry-standard software.

3. The system of claim 1, wherein the three-dimensional design software includes a commercially available three-dimensional design package.

4. The system of claim 1, wherein the difference between the first three-dimensional information and the second three-dimensional information is caused by a change made to the three-dimensional design using the three-dimensional design software.

5. The system of claim 1, wherein the first or second three-dimensional information includes a representation of the three-dimensional design in a two-dimension model and/or in a three-dimension model.

6. The system of claim 1, wherein the first or second three-dimensional information is obtained over a network.

7. The system of claim 1, wherein the one or more physical processors are further configured by machine-readable instructions to determine whether the first or the second three-dimensional information comprises a geometry error.

8. The system of claim 1, wherein the one or more physical processors are further configured by machine-readable instructions to enable the user to interact with the immersive virtual reality environment by enabling the user to toggle between different parts in the immersive virtual reality environment.

9. The system of claim 1, wherein the one or more physical processors are configured by machine-readable instructions to provide the virtual reality information to a plurality of display devices associated with at least two users such that the at least two users are enabled to interact with the immersive virtual reality environment via their respective display devices simultaneously or near-simultaneously.

10. The system of 1, wherein the one or more physical processors are further configured by machine-readable instructions to enable the user to share the virtual reality information with another user through a social media-like website.

11. The system of claim 1, wherein generating the virtual reality information includes obtaining lighting information from the user, the lighting information being used to create illumination in the immersive virtual reality environment.

12. The system of claim 1, wherein generating virtual reality information includes obtaining sound information from the user, the sound information corresponding to one or more locations in the immersive virtual reality environment and being used to create commentary for interaction with the one or more corresponding locations in the immersive virtual reality environment.

13. The system of claim 1, wherein the determination of the virtual reality information further includes obtaining virtual reality presentation capability of the client device and determining the virtual reality information based on the presentation capability of the client device.

14. The system of claim 1, wherein the determination of the virtual reality information based on the presentation capability of the client device includes determining two-dimensional graphics should be presented instead of three-dimensional graphics on the client device.

15. A method configured for providing an immersive virtual reality environment to a user, the immersive virtual reality environment being provided based on a three-dimensional design produced using three-dimensional design software, the method being implemented in one or more physical processors, the method comprising:
    automatically obtaining three-dimensional information representing the three-dimensional design, wherein the three-dimensional information representing the three-dimensional design is automatically obtained responsive to a file import of a file associated with the three-dimensional design software;
    determining virtual reality information using a virtual reality provision component for providing the immersive virtual reality environment through a head mounted display device based on the three-dimensional information, the immersive virtual reality environment comprising one or more three-dimensional virtual objects simulating the three-dimensional design such that the user is immersed in the virtual reality environment to interact with the three-dimensional virtual objects in the virtual reality environment via the head mounted display device associated with the user, wherein the determination of the virtual reality information includes:
        obtaining a first three-dimensional information automatically at a first time point;
        generating the virtual reality information using the virtual reality provision component at the first time point based on the first three-dimensional information automatically obtained at the first time point;
        displaying the virtual reality information generated using the virtual reality provision component at the first time point on the head mounted display device associated with the user;
        obtaining a second three-dimensional information automatically at a second time point;
        determining whether the second three-dimensional information automatically obtained at the second time point is different from the first three-dimensional information obtained at the first time point; and
        responsive to a determination that the second three-dimensional information obtained at the second time point is different from the first three-dimensional information obtained at the first time point, re-generating the virtual reality information by modifying the virtual reality information generated at the first time point by inputting a difference between the first three-dimensional information and the second three-dimensional information into the virtual reality information generated at the first time point using the virtual reality provision component without re-generating by the virtual reality provision component, the virtual reality information generated at the first time point; and
    outputting the re-generated virtual reality information to on the head mounted display device associated with the user to enable the head mounted display device to display the re-generated virtual reality information including the difference between the first three-dimensional information and the second three-dimensional information in the immersive virtual reality environment to the user.

16. The method of claim 15, wherein the three-dimensional design software is industry-standard software.

17. The method of claim 15, further comprising enabling the user to interact with the virtual space by enabling the user to toggle between different parts in the virtual space.

18. The method of claim 15, further comprising providing the virtual reality information to a plurality of display devices associated with at least two users such that the at least two users are enabled to interact with the immersive virtual reality environment via their respective display devices substantially simultaneously.

* * * * *